US008873569B2

(12) United States Patent
Kim et al.

(10) Patent No.: US 8,873,569 B2
(45) Date of Patent: Oct. 28, 2014

(54) USER CENTRIC VIRTUAL NETWORK AND METHOD OF ESTABLISHING THE SAME

(75) Inventors: Sun Cheul Kim, Daejeon (KR); Sung Back Hong, Daejeon (KR); Ho Sun Yoon, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 13/618,751

(22) Filed: Sep. 14, 2012

(65) Prior Publication Data

US 2013/0163601 A1    Jun. 27, 2013

(30) Foreign Application Priority Data

Dec. 23, 2011   (KR) .......................... 10-2011-0141174

(51) Int. Cl.
 *H04L 12/40* (2006.01)
(52) U.S. Cl.
 USPC ......................................................... 370/400
(58) Field of Classification Search
 USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–522, 523–520, 521–529
 See application file for complete search history.

(56) References Cited

U.S. PATENT DOCUMENTS

| 7,810,149 | B2 * | 10/2010 | Islam et al. ..................... 726/11 |
| 8,223,731 | B2 * | 7/2012 | Lee et al. ...................... 370/338 |
| 8,489,716 | B2 * | 7/2013 | Vaswani et al. ............... 709/221 |
| 2006/0251088 | A1 * | 11/2006 | Thubert et al. ................ 370/401 |
| 2007/0050613 | A1 * | 3/2007 | Islam et al. ................... 713/150 |
| 2007/0140267 | A1 * | 6/2007 | Yang ............................. 370/401 |
| 2008/0117855 | A1 * | 5/2008 | Choi et al. .................... 370/315 |
| 2010/0167742 | A1 * | 7/2010 | Rajagopalan et al. ........ 455/436 |
| 2012/0106559 | A1 | 5/2012 | Kim et al. |
| 2013/0179580 | A1 * | 7/2013 | Short et al. ................... 709/227 |

FOREIGN PATENT DOCUMENTS

| KR | 10-0843761 | 7/2008 |
| KR | 1020110037833 | 4/2011 |
| KR | 1020120045515 | 5/2012 |

* cited by examiner

*Primary Examiner* — Jung-Jen Liu
(74) *Attorney, Agent, or Firm* — Nelson Mullins Riley & Scarborough LLP; Anthony A. Laurentano, Esq.; Lewis Lee, Esq.

(57) ABSTRACT

Provided is a method of establishing a user centric virtual network. The method includes: performing a first tunneling operation between a first tunnel end and an address translation device, which are connected to a first private network, and a tunnel relay device; performing a second tunneling operation between a second tunnel end and an address translation device, which are connected to a second private network, and the tunnel relay device; and performing a third tunneling operation between the tunnel relay device and an end client, wherein a virtual IP is allocated to each of the first and second tunnel ends, the address translation devices, the end client, and the tunnel relay device; and each of the first to third tunneling operations connects routing information on the virtual IP to a corresponding tunnel.

8 Claims, 7 Drawing Sheets

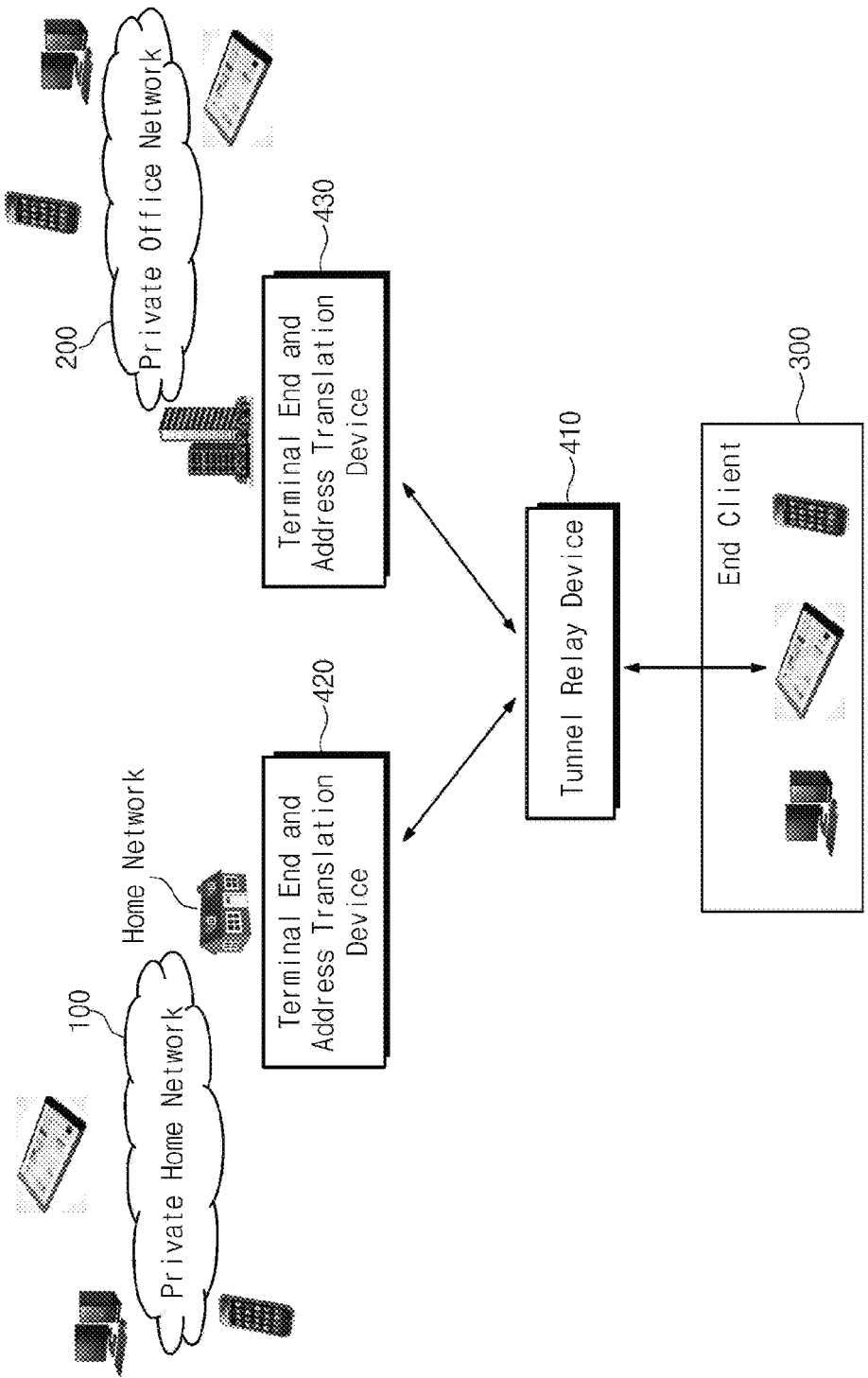

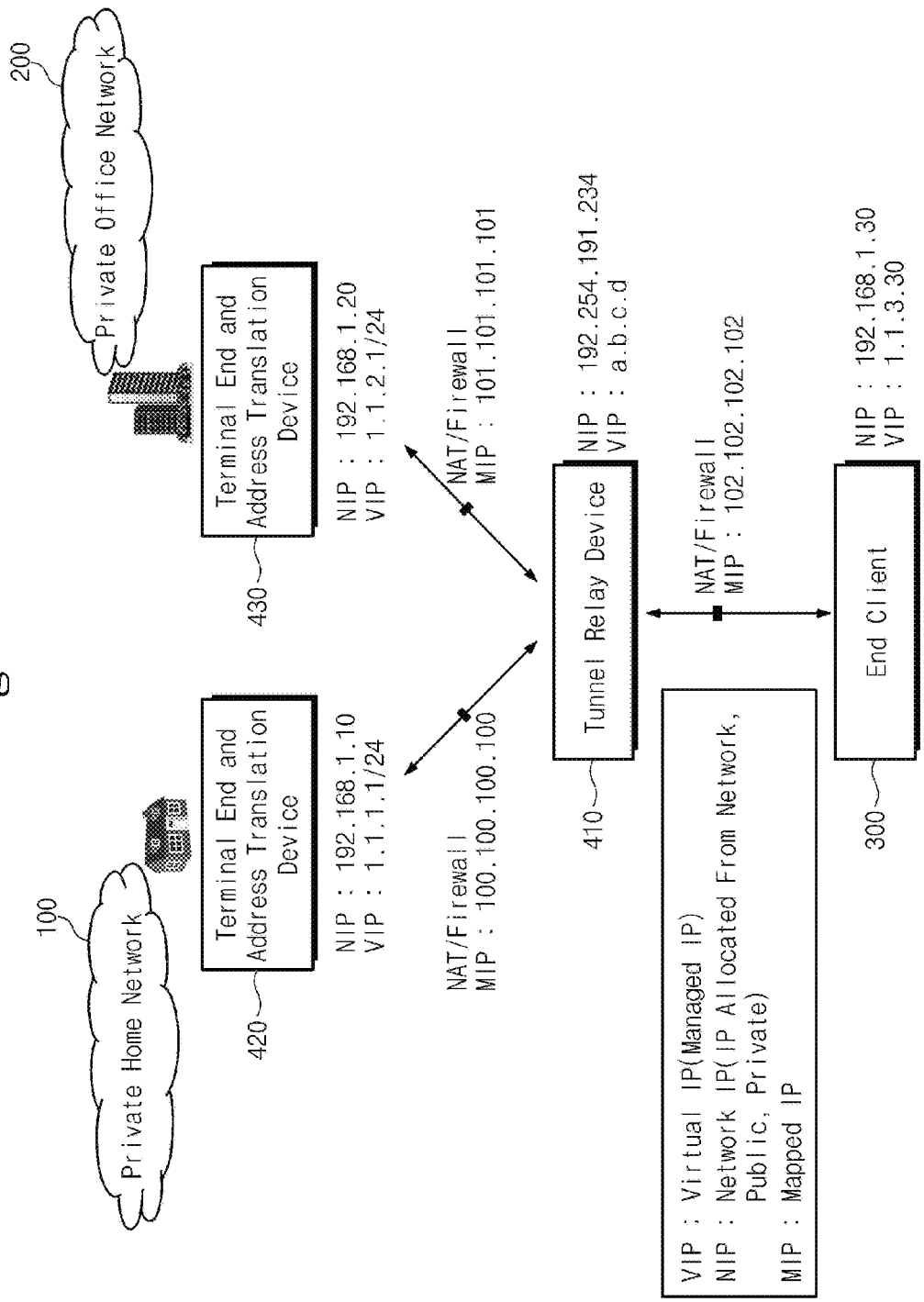

Fig. 4A

| Route | Tunnel ID | Local IP/Port | Remote IP/Port |
|---|---|---|---|
| 1.1.1.0/24 | Tunnel to Home | 192.254.191.234/48702 | 100.100.100.100/a |
| 1.1.2.0/24 | Tunnel to Office | 192.254.191.234/48702 | 101.101.101.101/b |
| 1.1.3.30/32 | Tunnel to Client | 192.254.191.234/48702 | 102.102.102.102/c |

Fig. 4B

| Route | Tunnel ID | Local IP/Port | Remote IP/Port |
|---|---|---|---|
| 1.1.2.0/24 | Tunnel to Relay Device | 192.168.1.10/48702 | 129.254.191.234/48702 |
| 1.1.3.30/32 | | | |

Fig. 4C

| Route | Tunnel ID | Local IP/Port | Remote IP/Port |
|---|---|---|---|
| 1.1.1.0/24 | Tunnel to Relay Device | 192.168.1.20/48702 | 129.254.191.234/48702 |
| 1.1.3.30/32 | | | |

Fig. 4D

| Route | Tunnel ID | Local IP/Port | Remote IP/Port |
|---|---|---|---|
| 1.1.1.0/24 | Tunnel to Relay Device | 192.168.1.20/48702 | 129.254.191.234/48702 |
| 1.1.2.0/24 | | | |

Fig. 5

| User | Equipment Used | Virtual IP | etc |
|---|---|---|---|
| Hong Gil-Dong-1 | Tunnel End and Address Translation Device_Home | 1.1.1.1/24 | ... |
| | Tunnel End and Address Translation Device_Office | 1.1.2.1/24 | ... |
| | End Client | 1.1.3.30 | ... |
| Hong Gil-Dong-2 | Tunnel End and Address Translation Device_Home | 1.2.1.1/24 | ... |
| | Tunnel End and Address Translation Device_Office | 1.2.2.1/24 | ... |
| | End Client | 1.2.3.30/32 | ... |
| ... | ... | ... | ... |

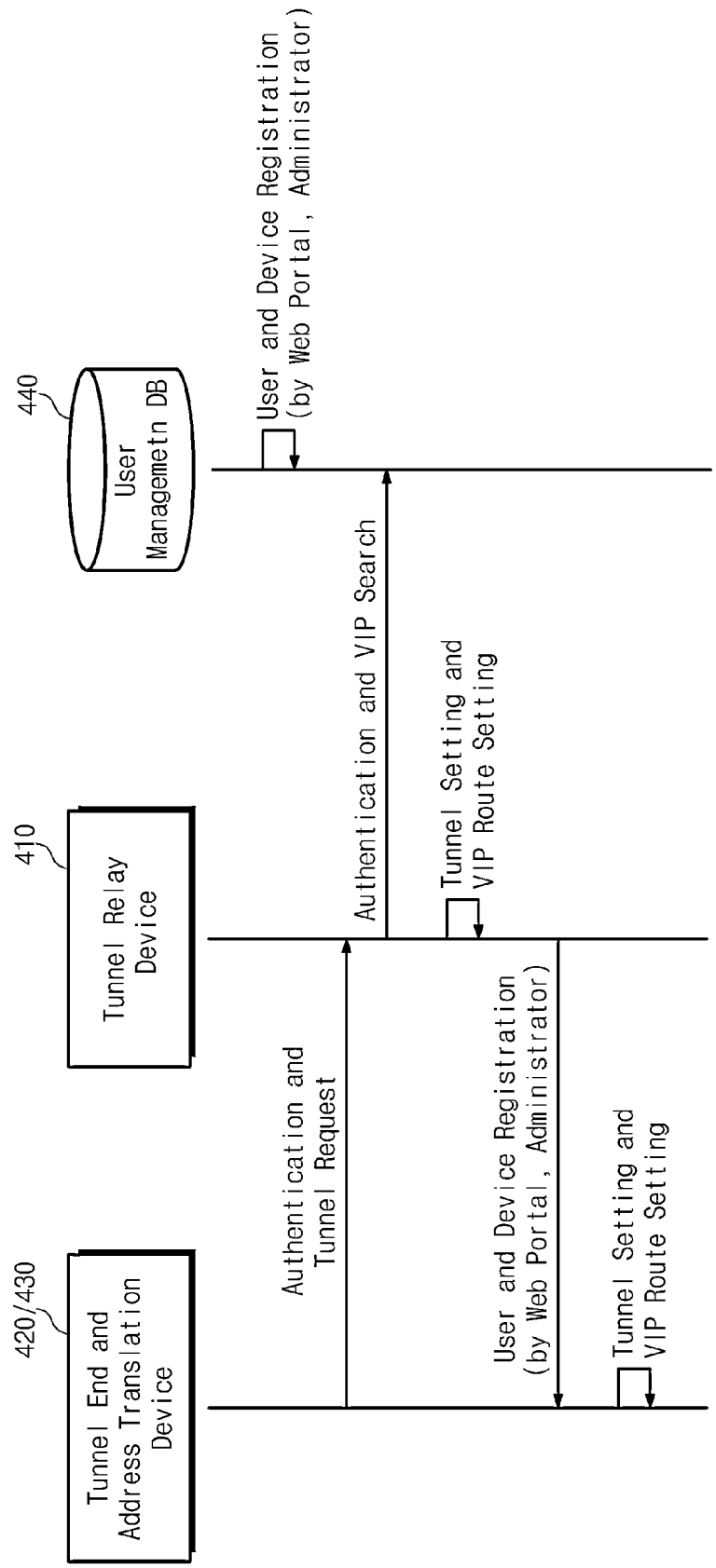

USER CENTRIC VIRTUAL NETWORK AND METHOD OF ESTABLISHING THE SAME

CROSS-REFERENCE TO RELATED APPLICATIONS

This U.S. non-provisional patent application claims priority under 35 U.S.C. §119 of Korean Patent Application No. 10-2011-0141174, filed on Dec. 23, 2011, the entire contents of which are hereby incorporated by reference.

BACKGROUND OF THE INVENTION

The present invention disclosed herein relates to a user centric virtual network and a method of establishing the same.

Since end terminals in the existing internet with routers are often connected to a Network Address Translator (NAT)/firewall, a direct communication environment between terminals is less likely provided. Due to this reason, current most internets have a home centric service type, which developed for a web centric or specific purpose. The internet having an open property is required to provide various communication services between terminals in addition to web or home central type services. However, in a current internet structure, there are many limitations in a communication method due to the intervention of the NAT/firewall.

FIG. 1 is a view illustrating a typical internet structure. Referring to FIG. 1, each of terminals such as PCs, smart phones, pads, and so on typically uses a private address allocated from homes, offices, or WiFi-zones. In a place where a home and an office are spatially separated, a private address is used so that a PC in a home cannot access a PC in an office. Additionally, a PC in a public network, of course, cannot access a PC in a home or an office. When a terminal using a private address performs communication via the internet, data transmission is performed through an address translation process using the NAT/internet routers.

Since a current network is required to block an access from an external or generally uses a firewall or an NAT due to the insufficiency of IP, a direct communication between terminals becomes very difficult. As a result, a server based P2P network environment is mainly configured. Especially, when an existing network environment is unavailable during data transmission, i.e., direct communication is not provided, an Application Layer Gateway (ALG) function is required to be established simultaneously. That is, the complexity and costs of establishing services become an issue.

Moreover, the background of the present invention relates to Korean Patent Application No. 10-2010-0081568, filed on Aug. 23, 2010, and Korean Patent Application No. 10-2010-0107107, filed on Oct. 29, 2010.

SUMMARY OF THE INVENTION

Korean Patent Application No. 10-2010-0081568 that underlies the present invention discloses a method of providing a direct communication environment between peer to peer, peer to network, and network to network, all of which are connected to a network that is established for accessible direct communication by using a virtual IP and a location IP. Thus, a direct communication better than a typical network environment is provided and thus, the costs and complexity of establishing new services are reduced. Additionally, Korean Patent Application No. 10-2010-0107107 discloses a communication method of a portable network unit.

The present invention provides a method of establishing his/her own virtual space that allows a user to connect to a desired network place at any time in addition to the above contents.

Embodiments of the present invention provide a method of establishing a user centric virtual network, the method including: performing a first tunneling operation between a first tunnel end and an address translation device, which are connected to a first private network, and a tunnel relay device; performing a second tunneling operation between a second tunnel end and an address translation device, which are connected to a second private network, and the tunnel relay device; and performing a third tunneling operation between the tunnel relay device and an end client, wherein a virtual IP is allocated to each of the first and second tunnel ends, the address translation devices, the end client, and the tunnel relay device; and each of the first to third tunneling operations connects routing information on the virtual IP to a corresponding tunnel.

In some embodiments, the method may further include each network address translator between the first tunnel end and address translation device and the tunnel relay device, between the second tunnel end and address translation and the tunnel relay device, and between the tunnel relay device and the end client.

In other embodiments, each of the performing of the first to third tunneling operations may include: transmitting/receiving a message for tunnel setting; and setting tunnel information and routing information by using the transmitted/received message.

In still other embodiments, the tunnel information may include an external IP and an external port, wherein the external IP is an address translated by the network address translator; and the external port is a port translated by the network address translator.

In even other embodiments, the tunnel relay device may: delete an outer header and a user datagram protocol header of the tunnel when a packet corresponding to a set tunnel arrives; and if there is a corresponding tunnel after referring to a virtual IP and routing information in an inner header, add the user datagram protocol header and the outer header to the packet and forward the packet to the tunnel.

In yet other embodiments, if a destination IP in the inner header is not an IP on a virtual network, the tunnel relay device may perform a network address translation function on an internet packet.

In further embodiments, each of the first and second tunnel ends and the address translation devices may set a virtual IP allocated from the tunnel relay device in a corresponding tunnel.

In still further embodiments, if the destination of a packet is in a virtual network area, the end client may transmit/receive a packet through tunneling, and if not, the end client transmits/receives a packet through an available interface.

In other embodiments of the present invention, a user centric virtual network includes: a tunnel end and an address translation device connected to a private network; a tunnel relay device transmitting data through the tunnel end and address translation device and first tunneling; and an end client transmitting data through the tunnel relay device and second tunneling, wherein each virtual IP is allocated to the tunnel end, the address translation device, the end client, and the tunnel relay device; and each of the first and second tunneling connects routing information on the virtual IP to a corresponding tunnel.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2 is a conceptual view illustrating a virtual network configuration for each user according to an embodiment of the present invention;

FIG. 3 is a view illustrating setting information for each component of a virtual network established through a tunneling function;

FIG. 4A illustrates routing information set in the tunnel relay device 410 and routing information connected to the tunnel information;

FIG. 4B illustrates tunnel information set in a home tunnel end and the address translation device and routing information connected to the tunnel information;

FIG. 4C illustrates tunnel information set in an office tunnel end and the address translation device and routing information connected to the tunnel information;

FIG. 4D illustrates tunnel information set in the end client and routing information connected to the tunnel information;

FIG. 5 is a view illustrating information for allocating and managing a virtual IP necessary to configure a virtual network for each of a plurality of users; and FIG. 6 is a conceptual view when the terminal end and address translation device or the end client transmits user management information, i.e., managed user and device information, to the tunnel relay device, while performing an authentication and tunneling process.

DETAILED DESCRIPTION OF PREFERRED EMBODIMENTS

Figure 1:
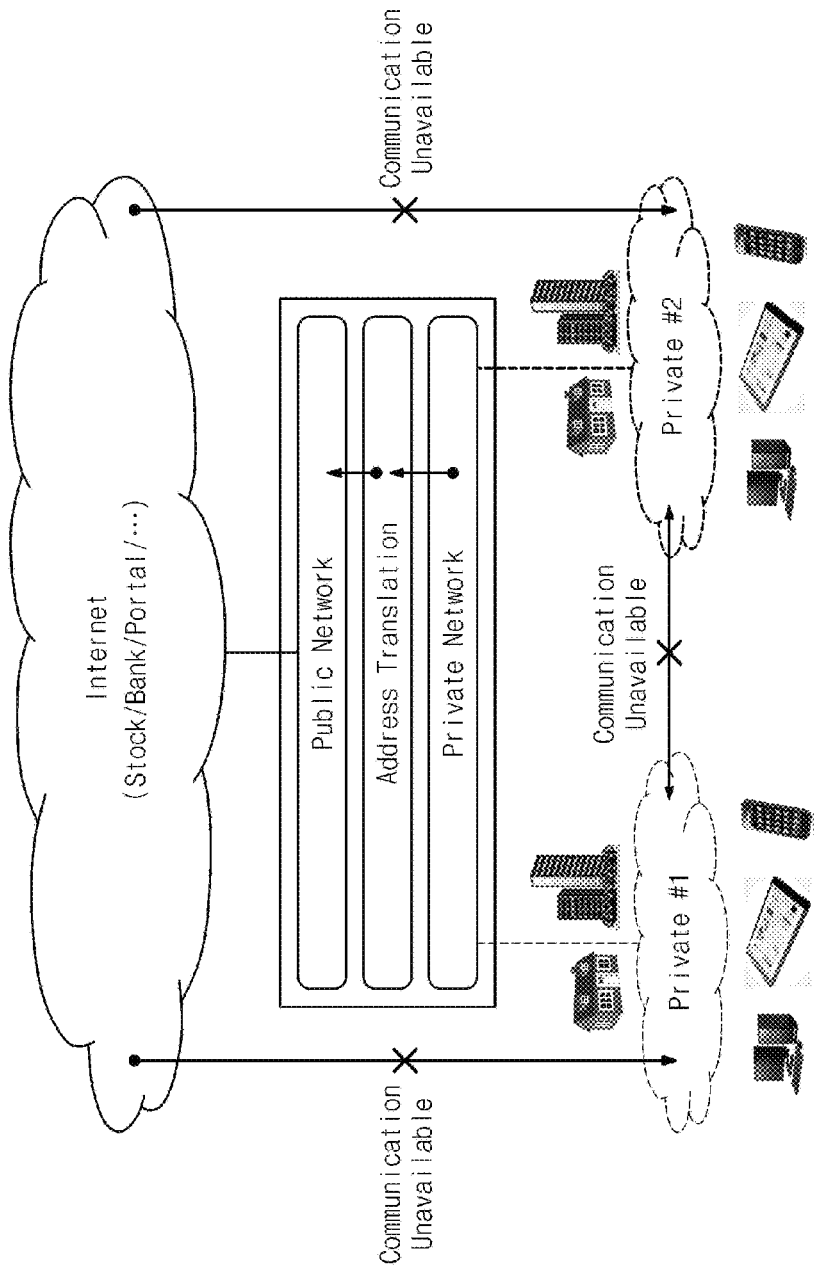
FIG. 1 is a view illustrating a typical internet structure.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Korean Patent Application No. 10-2010-0081568 that underlies the present invention discloses a method of providing a direct communication environment between peer to peer, peer to network, and network to network, all of which are connected to a network that is established for accessible direct communication by using a virtual IP and a location IP. Thus, a direct communication better than a typical network environment is provided and thus, the costs and complexity of establishing new services are reduced. Additionally, Korean Patent Application No. 10-2010-0107107 discloses a communication method of a portable network unit.

The present invention provides a method of establishing his/her own virtual space that allows a user to connect to a desired network place at any time in addition to the above contents. In such an internet environment, a user connects to a desired private network in order to configure his/her own virtual network, for example, a private network in a home (hereinafter, referred to as a private home network) and a private network in an office (hereinafter, referred to as a private office network). Therefore, a terminal used in a travelling place or a business trip place becomes available for mutual communication, so that all network based applications for data sharing and remote desktop may be possible.

FIG. 2 is a conceptual view illustrating a virtual network configuration for each user according to an embodiment of the present invention. In order to configure a virtual network, it includes a tunnel relay device 410 connecting each private network and forwarding data, terminal ends and address translation devices 420 and 430 in private networks 100 and 200, and an end client 300 used for connection by a terminal unit not a network unit. Procedures of establishing a direct communication available virtual network by performing a tunneling operation between the tunnel relay device 410, the terminal ends and address translation devices 420 and 430, and the end client 300 may refer to the contents of Korean Patent Application No. 10-2010-0081568, and Korean Patent Application No. 10-2010-0107107.

FIG. 3 is a view illustrating setting information for each component of a virtual network established through a tunneling function. A used or set address includes three kinds of addresses. First, an NIP may represent an IP allocated from a network, and may be a common address or a private address. VIP represents a managed virtual IP used in the present invention. A Mapped IP (MIP) is an address converted by a Network Address Translator (NAT) when the terminal ends and address translation devices 420 and 430 or the end client 300 is connected to the NAT.

In the configuration of FIG. 3, the terminal ends and address translation devices 420 and 430 and the end client 300 transmit/receive a message for tunneling setting to/from the tunnel relay device 410 in order to configure a user centric virtual network. As a result, the following tunnel information and routing information are set. Detailed contents on message transmission for tunnel setting refer to those of Korean Patent Application No. 10-2010-0081568, and Korean Patent Application No. 10-2010-0107107.

FIG. 4A illustrates routing information set in the tunnel relay device 410 and routing information connected to the tunnel information. A remote IP in each tunnel information is not an address of a target device when the NAT intervenes but is an NAT address. A remote port is a port that the NAT changes.

FIG. 4B illustrates tunnel information set in a home tunnel end and the address translation device 420 and routing information connected to the tunnel information.

FIG. 4C illustrates tunnel information set in an office tunnel end and the address translation device 430 and routing information connected to the tunnel information.

FIG. 4D illustrates tunnel information set in the end client 300 and routing information connected to the tunnel information.

After such settings, the transmission content of a packet for each component is as follows.

In the case of the tunnel relay device 410, three tunnels are set for each device, and routing information is connected to each tunnel. Therefore, when a corresponding packet is tunneled and arrives, an outer header of a tunnel and a User Datagram Protocol (UDP) header are deleted. Moreover, if there is a corresponding tunnel on reference to report routing information, a virtual IP of an inner header is forwarded with a UDP header and outer header attached to the corresponding tunnel.

If a destination IP of the inner header is not an IP on a virtual network, since a packet is transmitted via an existing internet, the tunnel relay device 410 performs an address translation function of the NAT on the internet packet. The tunneling and detailed contents refer to those of Korean Patent Application No. 10-2010-0081568, and Korean Patent Application No. 10-2010-0107107.

The terminal ends and address translation devices 420 and 430 set one tunnel after the tunnel relay device 410 performs a tunneling operation, and set a VIP address area allocated from the tunnel relay device 410 in a corresponding tunnel.

Accordingly, in the case of a device in a home, "1.1.2.0/24" and "1.1.3.30/32" routing information, i.e., a virtual network address area, is connected to a corresponding tunnel. In the case of a device in an office, "1.1.1.0/24" and "1.1.3.30/32" routing information, i.e., a virtual network address area, is connected to a corresponding tunnel. The packet transmission to a virtual network is done through tunneling, and if a packet destination is not a virtual network, an address translation function of the NAT needs to be performed in order to transmit the packet.

The end terminal 300 operates after being installed in PCs, notebooks, phones, and pads, and is an end point of a tunnel. If the destination of a packet is a virtual network area, the packet is tunneled and transmitted, and if not, the data are transmitted to an existing available interface.

That is, an internet use becomes available when a packet to a virtual network is transmitted through tunneling, the terminal ends and address translation devices 420 and 430 add a NAT function in the case of a packet to the internet, and a packet is separated by an existing interface in the case of the end client 300.

Additionally, by setting routing information as default in the terminal ends and address translation devices 420 and 430 and each end client 300 depending on the purpose, all packets are tunneled to the tunnel relay device 410. At this point, the tunnel relay device 410 performs the address translation function of the NAT on a packet not to a virtual network.

The tunnel relay device 410 may be a server system of Linux, Windows, or UNIX, or may be equipment based on hardware such as a router or a switch.

The terminal ends and address translation devices 420 and 430 may be a common device such as a wired router and a wireless router, or may be a device such as WiBro/HSDPA Egg.

The end client 300 may be IT equipment such as note books, PCs, pads, and tabs.

FIG. 5 is a view illustrating information for allocating and managing a virtual IP necessary to configure a virtual network for each of a plurality of users. This information may be in the tunnel relay device 410 and may be managed through a function of Web/Portal.

A virtual IP and prefix may be determined by an administrator, and may be automated through an algorithm that determines a value. In the case of the terminal ends and address translation devices 420 and 430, a necessary virtual IP area is allocated, and in the case of the end client 300, 32 bit Full-Mask is allocated. As a virtual IP for each user and device is allocated, since a virtual network for each user is required to be established, a virtual IP needs to be separated.

That is, Hong Gil-dong-1 is allocated in a 1.1.0.0/16 area in order for the two terminal ends and address translation devices 420 and 430 and one software client. That is, Hong Gil-dong-2 is allocated in a 1.2.0.0/16 area in order for the two terminal ends and address translation devices 420 and 430 and one software client. Therefore, Hong Gil-dong-1 and Hong Gil-dong-2 may constitute each virtual network. Accordingly, Hong Gil-dong-1 cannot access the virtual network of Hong Gil-dong-2, and vice versa.

A virtual IP area allocated to each device is described in a broad sense for easy understanding, and when service is actually provided, it is allocated and used in a small unit, i.e., a narrow 10 virtual IP section for each device.

FIG. 6 is a conceptual view when the terminal end and address translation device 420 or 430 or the end client 300 transmits user management information, i.e., managed user and device information, to the tunnel relay device 410, while performing an authentication and tunneling process.

A user management database (DB) 440 may be inputted by a web portal or an administrator as shown in FIG. 5. During authentication and tunnel request, a tunnel relay device confirms user information and device information and provides virtual IP information corresponding to a user.

That is, in the case of Hong Gil-dong-1, VIP route information provides all of "1.1.1.1/24", "1.1.2.1/24", and "1.1.1.1/30". Each device sets a corresponding tunnel and connects provided VIP routing information to the tunnel. Through such procedures, Hong Gil-dong-1 may have its own customized virtual network between a home, an office, and an end client.

The present invention provides a method of establishing a user centric virtual network for free communication in a network having a firewall/NAT on the basis of a virtual address.

The method includes providing a IP-(UDP/TCP)-IP tunneling method that uses a typical NAT/firewall determination technique, distinguishing and managing a user and a device, allocating and providing a virtual IP for each user and device, performing by a tunnel end and an address translation device, or an end client a tunneling operation with a tunnel relay device, and connecting virtual IP routing information between devices to a corresponding tunnel. Therefore, the method allows a user to connect to a desired network place at any time. That is, in connection to home and office networks, a user may easily access the networks by using an end client at an external place such as a travelling place or a business trip place, and also may use network based applications for PC directory sharing, a remote desktop, and a document management system.

Accordingly, the present invention may establish a user centric virtual network even in a private network in these times that IPs become insufficient and private IPs are spread. Thus, a free communication available environment may be provided between a home network, an office network, and an end client. Also, more flexible and efficient network environment than a typical restricted VPN environment may be established/provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of establishing a user centric virtual network, the method comprising:

performing a first tunneling operation between a first tunnel end and an address translation device, which are connected to a first private network, and a tunnel relay device;

performing a second tunneling operation between a second tunnel end and an address translation device, which are connected to a second private network, and the tunnel relay device; and performing a third tunneling operation between the tunnel relay device and an end client, wherein a virtual IP is allocated differently for each user, to each of the first and second tunnel ends, the address translation devices, the end client, and the tunnel relay device; and each of the first to third tunneling operations connects routing information on the virtual IP to a corresponding tunnel;

wherein each network address translator between the first tunnel end and address translation device and the tunnel relay device, between the second tunnel end and address translation and the tunnel relay device, and between the tunnel relay device and the end client.

2. The method of claim 1, wherein each of the performing of the first to third tunneling operations comprises:

transmitting/receiving a message for tunnel setting; and setting tunnel information and routing information by using the transmitted/received message.

3. The method of claim 2, wherein the tunnel information comprises an external IP and an external port, wherein the external IP is an address translated by the network address translator; and the external port is a port translated by the network address translator.

4. The method of claim 2, wherein the tunnel relay device:

deletes an outer header and a user datagram protocol header of the tunnel when a packet corresponding to a set tunnel arrives; and if there is a corresponding tunnel after referring to a virtual IP and routing information in an inner header, adds the user datagram protocol header and the outer header to the packet and forwards the packet to the tunnel.

5. The method of claim 1, wherein if a destination IP in the inner header is not an IP on a virtual network, the tunnel relay device performs a network address translation function on an internet packet.

6. The method of claim 2, wherein each of the first and second tunnel ends and the address translation devices sets a virtual IP allocated from the tunnel relay device in a corresponding tunnel.

7. The method of claim 2, wherein if the destination of a packet is in a virtual network area, the end client transmits/receives a packet through tunneling, and if not, the end client transmits/receives a packet through an available interface.

8. A user centric virtual network comprising:

a tunnel end and an address translation device connected to a private network;

a tunnel relay device transmitting data through the tunnel end and address translation device and first tunneling; and an end client transmitting data through the tunnel relay device and second tunneling, wherein each virtual IP is allocated differently for each user, to the tunnel end, the address translation device, the end client, and the tunnel relay device; and each of the first and second tunneling connects routing information on the virtual IP to a corresponding tunnel;

wherein each network address translator between the first tunnel end and address translation device and the tunnel relay device, between the second tunnel end and address translation and the tunnel relay device, and between the tunnel relay device and the end client.

* * * * *